United States Patent
Kiiski et al.

(10) Patent No.: US 12,037,556 B2
(45) Date of Patent: Jul. 16, 2024

(54) DIESEL FUEL COMPOSITION AND A METHOD FOR PRODUCING A DIESEL FUEL COMPOSITION

(71) Applicant: Neste Oyj, Espoo (FI)

(72) Inventors: Ulla Kiiski, Porvoo (FI); Markku Kuronen, Porvoo (FI); Jenni Nortio, Porvoo (FI)

(73) Assignee: NESTE OYJ, Espoo (FI)

(*) Notice: Subject to any disclaimer, the term of this patent is extended or adjusted under 35 U.S.C. 154(b) by 0 days.

(21) Appl. No.: 18/051,164

(22) Filed: Oct. 31, 2022

(65) Prior Publication Data

US 2023/0082920 A1  Mar. 16, 2023

Related U.S. Application Data

(63) Continuation of application No. 16/326,517, filed as application No. PCT/FI2017/050597 on Aug. 25, 2017, now Pat. No. 11,485,924.

(30) Foreign Application Priority Data

Aug. 26, 2016 (FI) ...................... 20165635

(51) Int. Cl.
*C10L 10/14* (2006.01)
*C10G 3/00* (2006.01)
(Continued)

(52) U.S. Cl.
CPC ............... *C10L 10/14* (2013.01); *C10G 3/42* (2013.01); *C10G 3/50* (2013.01); *C10G 45/58* (2013.01);
(Continued)

(58) Field of Classification Search
CPC .. C10L 10/14; C10L 1/08; C10L 1/231; C10L 10/12; C10L 2200/0469;
(Continued)

(56) References Cited

U.S. PATENT DOCUMENTS 7,189,269 B2   3/2007  Clark et al.
8,912,374 B2  12/2014  Van Heuzen et al.
(Continued)

FOREIGN PATENT DOCUMENTS

CN    1714138 A   12/2005
CN  101287812 A   10/2008
(Continued)

OTHER PUBLICATIONS

Smagala et al., Hydrocarbon Renewable and Synthetic Diesel Fuel Blendstocks: Composition and Properties, Nov. 2012, Energy Fuels, vol. 27, pp. 237-246. (Year: 2012).*

(Continued)

*Primary Examiner* — Cephia D Toomer
(74) *Attorney, Agent, or Firm* — Buchanan Ingersoll & Rooney, PC

(57) ABSTRACT

The invention discloses methods for manufacturing and using a diesel fuel composition comprising a cetane number improver, a fossil fuel component, and a hydrotreated renewable fuel component manufactured by hydrotreating and isomerising renewable raw material.

16 Claims, 4 Drawing Sheets

(51) Int. Cl.
C10G 45/58 (2006.01)
C10G 65/04 (2006.01)
C10L 1/08 (2006.01)
C10L 1/23 (2006.01)
C10L 10/12 (2006.01)

(52) U.S. Cl.
CPC ............. *C10G 65/043* (2013.01); *C10L 1/08* (2013.01); *C10L 1/231* (2013.01); *C10L 10/12* (2013.01); *C10G 2300/1014* (2013.01); *C10G 2300/307* (2013.01); *C10G 2300/70* (2013.01); *C10G 2400/04* (2013.01); *C10L 2200/0469* (2013.01); *C10L 2270/026* (2013.01); *Y02E 50/10* (2013.01); *Y02P 30/20* (2015.11)

(58) Field of Classification Search
CPC ....... C10L 2270/026; C10G 3/42; C10G 3/50; C10G 45/58; C10G 65/043; C10G 2300/1014; C10G 2300/307; C10G 2300/70; C10G 2400/04; Y02E 50/10; Y02P 30/20

See application file for complete search history.

(56) References Cited

U.S. PATENT DOCUMENTS

| 2004/0128905 | A1 | 7/2004 | Clark et al. | |
|---|---|---|---|---|
| 2005/0262759 | A1 | 12/2005 | Tort et al. | |
| 2008/0033220 | A1 | 2/2008 | Wardle et al. | |
| 2008/0163542 | A1* | 7/2008 | Krupa | C10L 1/02 44/308 |
| 2009/0077868 | A1 | 3/2009 | Brady et al. | |
| 2010/0064574 | A1 | 3/2010 | de Almeida et al. | |
| 2011/0126449 | A1* | 6/2011 | Xu | C10L 1/08 44/388 |
| 2012/0132182 | A1 | 5/2012 | Gunter et al. | |
| 2012/0132183 | A1 | 5/2012 | Gunter et al. | |
| 2013/0276362 | A1 | 10/2013 | Boehnke | |
| 2019/0225904 | A1 | 7/2019 | Kiiski et al. | |

FOREIGN PATENT DOCUMENTS

| EP | 1741768 A1 | 1/2007 |
|---|---|---|
| EP | 1956070 A1 | 8/2008 |
| EP | 2333032 A1 | 6/2011 |
| FI | 100248 B | 10/1997 |
| WO | 2007003709 A1 | 1/2007 |
| WO | 2008113492 A1 | 9/2008 |
| WO | 2011073780 A1 | 6/2011 |
| WO | 2015181721 A1 | 12/2015 |
| WO | 2018037163 A1 | 3/2018 |

OTHER PUBLICATIONS

Innospec Cetane Number Improvers CI-0801 (at least as early as 2008). (Year: 2008).*
"Automotive Fuels-Paraffinic Diesel from Synthesis or Hydrotreatment-Requirements and Test Methods" CEN Workshop Agreement, CWA 15940, Feb. 2009. (10 pages).
"Fuel Additives: Use and Benefits", ATC Document, Sep. 2013. (68 pages).
"Hydrotreated vegetable oil (HVO)—premium renewable biofuel for diesel engines", Neste Oil, Feb. 2014. (56 pages).
"Optimized Usage of NExBTL Renewable Diesel Fuel", VTT Research Notes 2604, 2011. (180 pages).
"Performing Tests According to the Examples of the Patented". (6 pages).
2-Ethylhexyl Nitrate (2-EHN) Best Practices Manual, ATC, published Aug. 2004, p. 5. (24 pages).
A. Thompson et al., "Prediction and Precision of Cetane Number Improver Response Equations", SAE International Fall Fuels & Lubricants Meeting & Exposition, Tulsa, Oklahoma, Oct. 1997, SAE Technical Paper Series, 972901. (8 pages).
Aatola et al., "Hydrotreated Vegetable Oil (HVO) as a Renewable Diesel Fuel: Trade-off between NOx, Particulate Emission, and Fuel Consumption of a Heavy Duty Engine", SAE International, 2008-01-2500, 2008. (12 pages).
Characterization of the HVO used for testing O8, HVO Characterization Performed by an Independent Laboratory, with English Translation. (5 pages).
Communication of a Notice of Opposition issued on Jun. 29, 2021, by the European Patent Office in corresponding European Application No. 17767858.8. (161 pages).
Declaration of Dr. Richard H. Clark.
E. Ilery, Experimental Study of 2-ethylhexyl Nitrate Effects on Engine Performance and Exhaust Emissions of a Diesel Engine Fueled with n-butanol or 1-pentanol Diesel-Sunblower Oil Blends, Energy Conversion and Management, vol. 118, 2016, pp. 320-330.
EPO Communication Under A.94(3) EPC of Nov. 28, 2019. (3 pages).
Finnish Search Report dated Dec. 20, 2016, issued by the Finnish Patent Office in the corresponding Finnish Patent Application No. 20165635. (2 pages).
First Office Action issued on Aug. 20, 2020, by the Chinese Patent Office in corresponding Chinese Patent Application No. 201780051848.9, and an English Translation of the Office Action. (17 pages).
HVO, Hydrotreated Vegetable Oil—A Premium Renewable Biofuel for Diesel Engines, Neste Oil Proprietary, Jun. 2012. (51 pages).
International Search Report (PCT/ISA/210) issued on Oct. 25, 2017, by the European Patent Office as the International Searching Authority for International Application No. PCT/FI2017/050597. (5 pages).
L. Lindfors, "High Quality Transportation Fuels from Renewable Feedstock", Neste Oil Corporation, XXIst World Energy Congress, Montreal, Canada, Sep. 12-16, 2010. (12 pages).
M. F. Ruszkowski, "Testing of hydrotreated vegetable oil as biocomponent in diesel fuel", ISSN 0353—Goriva i Maziva (Fuels and Lubricants), vol. 53, Nol. 4, 2014, pp. 329-341.
NBN EN 15195, Dec. 2014.
NF M07-118, NF EN15195, Aug. 20, 2016. (33 pages).
NF M07-161, NF EN 16715:2017, Dec. 2017, www.afnor.org. (30 pages).
NF M15-024, NF EN 590, Jan. 2014, www.afnor.org. (19 pages).
Office Action (Invitation to Respond to Written Opinion) issued on Mar. 18, 2020, by the Singaporean Patent Office in corresponding Singaporean Patent Application No. 11201901172Q. (10 pages).
Optibio Report: Optimized Usage of NExBTL Renewable Biofuel for Diesel Engines, Neste Oil Proprietary, Jun. 2012. (113 pages).
Proprietor's Letter dated Jun. 14, 2018 in response to the PCT Written Opinion. (4 pages).
Proprietor's Letter dated Mar. 19, 2020 in response to the Communication Under Article 94(3) EPC. (5 pages).
R.H. Clark et al., "The Performance of Diesel Fuel Manufactured by Shell's GTL Technology in the Latest Technology Vehicles", Shell Global Solutions, for the Proceedings of 3rd Int. Colloquium, "Fuels," Tech. Akd. Esslingen, Ostfildern, Germany, Jan. 17-18, 2001. (8 pages).
Written Opinion (PCT/ISA/237) issued on Oct. 25, 2017, by the European Patent Office as the International Searching Authority for International Application No. PCT/FI2017/050597. (8 pages).
X. Montagne, "Carburants Liquides—Gazoles, Jets Fuels Et Autres Distillats Moyens", Techniques De L'ingenieur, Jul. 10, 2011. (18 pages).
Y. Scharff et al., "Catalyst Technology for Biofuel Production: Conversion of Renewable Lipids Into Biojet and Biodiesel", OCL, 2013. (4 pages).
Notification of Transmittal of The International Preliminary Report on Patentability (Form PCT/IPEA/416) and International Preliminary Report on Patentability (PCT Article 36 and Rule 70) (Form PCT/IPEA/409), issued on Oct. 17, 2018, by the European Patent Office for International Application No. PCT/FI2017/050597. (16 pages).

* cited by examiner

| Carbon number | GTL1 Paraffins total [wt-%] | RN2 Paraffins total [wt-%] |
|---|---|---|
| 3 | 0,00 | 0,00 |
| 4 | 0,00 | 0,00 |
| 5 | 0,00 | 0,01 |
| 6 | 0,00 | 0,05 |
| 7 | 0,03 | 0,11 |
| 8 | 0,20 | 0,32 |
| 9 | 1,08 | 0,46 |
| 10 | 3,46 | 0,56 |
| 11 | 5,93 | 0,52 |
| 12 | 7,20 | 0,64 |
| 13 | 8,03 | 0,97 |
| 14 | 9,55 | 2,29 |
| 15 | 9,76 | 6,68 |
| 16 | 9,23 | 20,98 |
| 17 | 8,78 | 17,71 |
| 18 | 8,18 | 46,03 |
| 19 | 7,42 | 0,94 |
| 20 | 6,72 | 1,20 |
| 21 | 5,93 | 0,17 |
| 22 | 4,43 | 0,19 |
| 23 | 2,54 | 0,04 |
| 24 | 1,11 | 0,02 |

Fig. 5

DIESEL FUEL COMPOSITION AND A METHOD FOR PRODUCING A DIESEL FUEL COMPOSITION

PRIORITY DATA

This patent application is a continuation application of U.S. patent application Ser. No. 16/326,517, filed on Feb. 19, 2019, which is a U.S. National Stage application of PCT/FI2017/050597 filed on Aug. 25, 2017, which claims priority to Finnish Patent Application No. FI20165635 filed on Aug. 26, 2016, each of which is hereby incorporated by reference herein.

FIELD OF THE INVENTION

The present invention is related to the field of renewable fuels, and to methods for making them.

BACKGROUND

Cetane number describes the compression ignition behaviour of a diesel fuel. Higher cetane levels enable faster ignition in a diesel engine. Cetane number is one requirement in EN590:2013 (5.5.2) and ASTM D975 2017 diesel fuel standards. Requirement in EN 590:2013 (5.5.2) diesel is minimum 51 and in ASTM D975 2017 40, correspondingly. In diesel fuels cetane number targets can be reached either by refining, by blending, or by adding a cetane number improver, such as 2-ethyl hexyl nitrate (2-EHN). However, high 2-EHN dosing causes unpleasant smell to diesel fuel. There are also indications that 2-EHN effects to diesel NOx-emissions negatively and additionally according to EN590:2013 (5.5.2) cetane improver may cause increase of carbon residue.

Thus, there is a need to provide fuel compositions with high cetane number while reducing harmful effects linked to cetane number improvers.

EP1956070 discloses a method for producing a gas oil composition. The resulting product requires at least 500 ppm of gas-oil specific cetane number improver to obtain satisfactory cetane number [0142].

US2008033220 discloses increasing cetane number of GTL, a Fischer-Tropsch derived fuel.

SUMMARY

According to the first aspect of the invention is provided a method of manufacturing a diesel fuel composition comprising
- a. A hydrotreatment step comprising catalytically hydrotreating renewable raw material comprising fatty acids, triglycerides, fatty acid esters, or combinations thereof into n-paraffins;
- b. An isomerising step comprising catalytically isomerising the n-paraffins into branched chain paraffins to obtain a hydrotreated renewable fuel component; and
- c. adding a cetane number improver;
- wherein the step b. is carried out in the absence of the hydrotreating catalyst(s) used in the step a.

According to the second aspect of the invention is provided a diesel fuel composition comprising a hydrotreated renewable fuel component and a cetane number improver.

According to the third aspect of the invention is provided a use of the diesel fuel composition of the second aspect for increasing cetane number and improving cold properties of a diesel fuel.

According to the fourth aspect of the invention is provided a diesel fuel composition comprising: a. the diesel fuel composition of the second aspect; and b. a fossil fuel component.

According to another aspect of the invention there is provided a further diesel fuel composition comprising:
- a. a hydrotreated renewable fuel component;
- b. a fossil fuel component; and
- c. a cetane number improver.

According to another aspect of the invention there is provided a method for making a further diesel fuel composition comprising mixing:
- a. a hydrotreated renewable fuel component;
- b. a fossil fuel component; and
- c. a cetane number improver.

According to another aspect is provided method of improving cetane number of a fossil fuel composition comprising adding to the fuel composition
- a. a hydrotreated renewable fuel component; and
- b. a cetane number improver.

Herein disclosed is an exemplary diesel fuel composition comprising:
- a hydrotreated renewable fuel component and a cetane number improver, wherein the hydrotreated renewable fuel component contains at least 70 wt-% $C_{15}$-$C_{18}$ paraffins and has an i-paraffin/n-paraffin ratio of at least 2.2 w/w; and
- a fossil fuel component; wherein
- the hydrotreated renewable fuel component constitutes 5-90 vol-% of the diesel fuel composition; and
- the cetane number improver is 2-ethylhexyl nitrate (2-EHN), and the amount of 2-EHN is in a range of 100-1000 mg/kg in the diesel fuel composition.

Also described herein is a method for producing a diesel fuel composition comprising: mixing a hydrotreated renewable fuel component, a cetane number improver, and a fossil fuel component, wherein:
- the hydrotreated renewable fuel component comprises at least 70 wt-% $C_{15}$-$C_{18}$ paraffins and has an i-paraffin/n-paraffin ratio of at least 2.2 w/w; and
- the hydrotreated renewable fuel component constitutes 5-90 vol-% of the diesel fuel composition;
- the cetane number improver is 2-ethylhexyl nitrate (2-EHN); and
- the amount of 2-EHN is in the range of 100-1000 mg/kg in the diesel fuel composition.

Also disclosed is an exemplary method for improving cetane number in a diesel fuel composition, comprising:
- mixing a hydrotreated renewable fuel component, a cetane number improver, and a fossil fuel component, wherein:
  - the hydrotreated renewable fuel component comprises at least 70 wt-% $C_{15}$-$C_{18}$ paraffins and has an i-paraffin/n-paraffin ratio of at least 2.2 w/w; and
  - the hydrotreated renewable fuel component constitutes 5-90 vol-% of the diesel fuel composition;
  - the cetane number improver is 2-ethylhexyl nitrate (2-EHN); and
  - the amount of 2-EHN is in the range of 100-1000 mg/kg in the diesel fuel composition.

An advantage achieved by the invention is efficient increase of cetane number in fuel blends and/or fuel compositions comprising the present diesel fuel composition, in particular in fuel blends for diesel engines. As evidenced by Examples, the cetane number of diesel fuel compositions could be increased by including in it the present diesel fuel composition.

Another advantage achieved by the invention is that a low amount of a cetane number improver need to be used in fuel blends to achieve a desired cetane number, such as a cetane number required by a diesel fuel standard. FIG. 2 shows results of an Example where 2-EHN was used as a cetane number improver: a dose of 250 mg/kg resulted into a greater increase of the cetane number in a blend comprising hydrotreated renewable fuel component, compared to a GTL component. Thus, by using the present invention a lower amount of the cetane number improver can be used to increase the cetane number to a desired value, which helps to prevent or diminish harmful effects of cetane number improvers, such as 2-EHN. In particular NOx emission increase caused by larger amounts of 2-EHN can be avoided.

Another advantage of the invention is that a fuel composition can be obtained which has simultaneously both a good cetane number and also good cold properties. By the invention it is possible to obtain e.g. diesel fuel blends comprising fossil fuel and having said characteristics. Such diesel fuel blends are particularly good for use in cold climate.

Another advantage of the invention is that as step b. is carried out in the absence of the catalyst used in step a., problems relating to use of one-phase process, such as cracking and poor i-paraffin:n-paraffin ratio, can be avoided. Thus, the method is particularly useful to obtain a diesel fuel composition suitable for improving properties of diesel fuels used in cold climate.

The present diesel fuel composition can be mixed with fossil diesel fuel or renewable diesel fuel in a desired amount, depending on the desired properties of the fossil fuel or renewable diesel fuel. E.g. when the blend comprises diesel fuel with low cetane number, a higher proportion of the diesel fuel composition can be used to raise the cetane number of the blend. Correspondingly, if cold properties of the fossil fuel are to be improved, a fuel component can be used which has a higher i-paraffin/n-paraffin ratio, as defined below.

The cetane number increase achieved by the present invention was synergistic and much higher compared to the effect obtainable by using other fuel components, such as GTL. Without binding to any theory, the observed synergistic effect is caused by the manufacturing process of the diesel fuel component and the characteristics of the hydrotreated renewable fuel component and the cetane number improver. The synergistic effect was confirmed experimentally when the inventors used renewable fuel component having similar carbon number distribution as HVO. This finding was successfully used by the inventors to define a diesel fuel composition comprising a hydrotreated renewable fuel component, fossil fuel, and a cetane number improver.

The present diesel fuel composition is also advantageous in having high density, viscosity and lubricity.

BRIEF DESCRIPTION OF THE FIGURES

FIG. 5 shows a detailed distribution of paraffinic components in renewable fuel (RN2) and GTL fuels.

DETAILED DESCRIPTION

Figure 1:
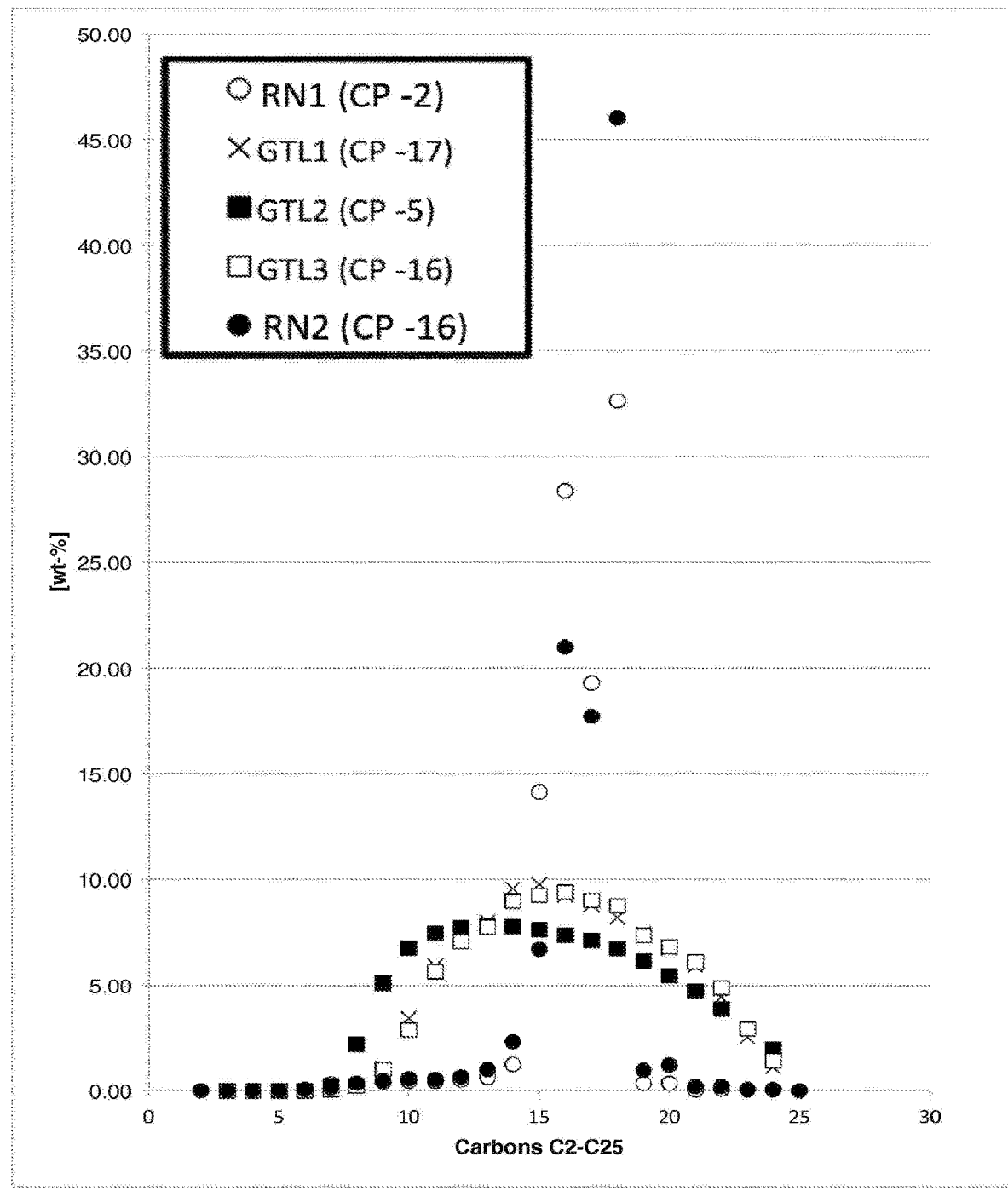
FIG. 1 shows the profile of paraffinic components for renewable fuel (RN2 and RN2) and GTL fuels. CP refers to cloud point.

In an embodiment the present renewable raw material comprises vegetable oil, wood and/or other plant based oil, animal fat, fish fat and/or fish oil, algae oil, microbial oil, fats contained in plants bred by means of gene manipulation, recyclable waste, recyclable residue, or a combination thereof.

In an embodiment the present renewable raw material comprises rapeseed oil, colza oil, canola oil, tall oil, sunflower oil, soybean oil, hempseed oil, olive oil, linseed oil, mustard oil, palm oil, peanut oil, castor oil, coconut oil, lard, tallow, train, fats contained in milk, or a combination thereof.

In an embodiment the present cetane number improver is 2-EHN.

In an embodiment in the present hydrotreated renewable fuel component the amount of the paraffinic component in the range of carbon number $C_{15}$-$C_{18}$ is at least 70 wt-%, more preferably more than 80 wt-%, most preferably more than 90 wt-%. Such carbon number distribution is a characteristic of the present renewable fuel component showing synergistic cetane number improvement with 2-EHN.

In an embodiment the i-paraffin/n-paraffin ratio of the present hydrotreated renewable component is at least 2.2 w/w, at least 2.3 w/w, at least 3 w/w or at least 4 w/w.

In an embodiment the renewable raw material is fed into the hydrotreatment step a. in a feed comprising less than 10 w-ppm alkaline metals and alkaline earth metals calculated as elemental alkaline metals and elemental alkaline earth metals, less than 10 w-ppm other metals calculated as elemental metals, and less than 30 w-ppm phosphorus calculated as phosphorus.

In an embodiment the feed comprises a fresh feed of the renewable raw material and a feed of a diluting agent, and wherein the diluting agent:fresh feed ratio is 10-30:1, preferably 12-25:1, and wherein the diluting agent is selected from hydrocarbons and recycled products of the process, or a mixture thereof.

In an embodiment in the hydrotreatment step pressure is selected from, or varies in, the range 2-15 MPa, preferably 3-10 MPa, and the temperature is selected from, or varies in, the range 200-500° C., preferably 280-400° C.

In an embodiment the hydrotreatment step is carried out in the presence of a hydrotreatment catalyst, which contains a metal from the Group VIII and/or Group VIB of the Periodic System.

In an embodiment the hydrotreatment catalyst is supported Pd, Pt, Ni, NiMo or CoMo catalyst and the support is alumina and/or silica.

In another embodiment the isomerisation catalyst contains a molecular sieve.

In another embodiment the isomerisation catalyst contains $Al_2O_3$ or $SiO_2$.

In another embodiment the isomerisation catalyst contains SAPO-11 or SAPO-41 or ZSM-22 or ZSM-23 or ferrierite; and Pt or Pd; and $Al_2O_3$ or $SiO_2$.

In an embodiment the cetane number improver is added to the hydrotreated renewable fuel component obtained in step b.

In an embodiment steps a. and b. are carried out repeatedly by feeding product recycle from step b. into step a. until a desired degree of hydration and isomerisation of the renewable raw material is obtained.

In an embodiment of the present diesel fuel composition, in the hydrotreated renewable fuel component the amount of the paraffinic component in the range of carbon number $C_{15}$-$C_{18}$ is at least 70 wt-% and the i-paraffin/n-paraffin ratio of the hydrotreated renewable component is at least 2.2 w/w, at least 3 w/w or at least 4 w/w.

In an embodiment the present diesel fuel composition has a cloud point of at least −10° C.

In an embodiment in the present diesel fuel composition the cetane number improver is 2-EHN.

In an embodiment in present diesel fuel composition the content of the hydrotreated renewable fuel component in the diesel fuel composition is in the range of 5-90 vol-%, more preferably in the range of 20-80 vol-%. This amount is advantageous because it reduces harmful effects of 2-EHN while raising the cetane number of the blend to a desired level.

In another embodiment the amount of the cetane number improver used in the present diesel fuel composition is less than 500 mg/kg, such as about 450, 400, 350, 300, 350, 300, 250, 200, 150, or 100 mg/kg. In an embodiment the amount is selected to be within the range 100-450 mg/kg, 100-400 mg/kg or 100-300 mg/kg.

In an embodiment in the present diesel fuel composition the cetane number improver is 2-EHN, and the amount of 2-EHN is below 2000 mg/kg, and more preferably selected from the range of 100-1000 mg/kg, most preferably from the range 100-400 mg/kg.

2-ethyl hexyl nitrate (2-EHN) is a cetane number improver, which can be used to improve, i.e. increase cetane number of fuels, such as diesel fuels.

GTL is a Fischer-Tropsch derived fuel having a similar cloud point than a fuel derived from HVO. GTL is characterized by broad distribution of paraffinic hydrocarbons in the range $C_9$-$C_{24}$. GTL has typically a cetane number in the range 73-81 (Aatola et al. Hydrotreated Vegetable Oil (HVO) as a Renewable Diesel Fuel: Trade-off between NOx, Particulate Emission, and Fuel Consumption of a Heavy Duty Engine, SAE International 2008-01-2500).

The inventors surprisingly found that even though HVO and GTL as such have similar properties with regard to cetane number, cloud point, and density, when used in blends comprising either HVO or GTL, a fossil fuel component, and a cetane number improver, a significantly different effect on the cetane number is achieved. A smaller addition of the cetane number improver in a HVO containing fuel blend is sufficient to increase the cetane number of the fuel blend to a level obtained in a GTL containing fuel blend only with a much higher cetane number improver addition. Consequently, by using HVO in the blend a much smaller cetane number improver addition is needed, reducing consumption and its harmful effects.

The GTL and HVO components were analysed in more detail in Example 1. The analysis revealed significant differences in the carbon number profiles of these two fuel components. As evidenced by the Examples and shown in FIGS. 1 and 5, the total paraffin distributions of these components are markedly different, resulting into different properties. Without binding to any theory, the results indicate that the characteristic paraffin profile of HVO component provides a synergistic effect with 2-EHN on the cetane number in fuel blends.

In an embodiment biological raw material comprises vegetable oil, animal fat, fish fat, fish oil, algae oil, microbial oil and/or wood and/or other plant based oil as well as recyclable waste and/or residue, or a combination thereof. In an embodiment the hydrotreated renewable fuel component obtained after hydrotreatment and isomerisation comprises HVO, or consists of HVO. Hydrotreating can be used for producing bio based middle distillate fuels. HVO fuels are sometimes referred to as "renewable fuels" instead of "biodiesel" which is a term reserved for the fatty acid methyl esters (FAME). Chemically hydrotreated vegetable oils are mixtures of paraffinic hydrocarbons and have a very low quantity of sulphur and aromatics.

The present diesel fuel composition is preferably manufactured using a two-step process comprising hydrogenation followed by isomerisation. If a manufacturing process is used using a one-step process in which the hydrogenation and isomerisation steps are not carried in separate steps, harmful cracking may occur which results into a loss of long chain hydrocarbons and a change of carbon number profile towards shorter carbon numbers. One-step hydrogenation and isomerisation may also result into inferior i-paraffin:n-paraffin ratio compared to a two-step process where these steps are carried out sequentially. In a preferred embodiment the two-step process is carried out by hydrogenating into n-paraffins followed by catalytic isomerisation into i-paraffins. Such a two-step process is described in FI1002488.

In an embodiment in the present hydrotreated renewable fuel component the amount of i-paraffins is increased compared to the amount of i-paraffins after hydrogenation and before isomerisation. In another embodiment the carbon number distribution does not change, or does not substantially change, during isomerisation. In a preferred embodiment the amount of paraffins in the carbon number range $C_3$-$C_{14}$ does not substantially increase during isomerisation.

In an embodiment the present hydrotreated renewable fuel component has a cloud point of at least −10° C. Such a cloud point is particularly useful for fuels intended for use in cold environment, such as winter grade diesel fuel. In an embodiment the cloud point is about −11, −12, −13, −14, −15, −16, −17, −18, −19, −20, −21, −22, −23, −24, −25, −26, −27, −28, −29 or −30° C.

In an embodiment the i-paraffin/n-paraffin ratio of the present hydrotreated renewable component is at least 2.2 w/w, such as about 2.2, 2.3, 2.4, 2.5, 2.6, 2.7, 2.8, 2.9, 3, 4, 5, 6, 7, 8, 9 or 10.

The fossil fuel component means a component or composition, which is naturally occurring and derived from non-renewable sources. Examples of such non-renewable resources include petroleum oil/gas, shale oil/gas, natural gas or coal deposits, and the like, and combinations thereof, including any hydrocarbon-rich deposits that can be utilized from ground/underground sources. The term fossil also refers to recycling material of non-renewable sources.

In an embodiment the fossil fuel component is fossil middle distillate, preferably fossil diesel. Diesel fuel in general is any liquid fuel suitable for use in diesel engines, where fuel ignition takes place without spark as a result of compression of the inlet air mixture and then injection of fuel. In an embodiment the present diesel fuel is fossil diesel. The most common type of diesel fuel is a specific fractional distillate of fossil fuel, preferably petroleum fuel oil. Distillation characteristics define how fuel is evaporated when it is sprayed into the combustion chamber of a diesel engine. Standards (e.g. EN590:2013 (5.5.2)) includes information about typical distillation curves.

To distinguish from alternative diesel fuels not derived from petroleum, petroleum-derived diesel is called herein as fossil diesel. It may also be called as e.g. petrodiesel, mineral diesel or petroleum distillate. Fossil diesel can comprise atmospheric or vacuum distillates. The distillate can comprise cracked gas oil or a blend of any proportion of straight run or thermally or catalytically cracked distillates. The distillate fuel can be subjected to further processing such hydrogen-treatment or other processes to improve fuel properties. Typically fossil diesel comprise naphthenics 10-50 weight %, monoaromatics 5-30 weight %, other polyaromatics 0-8 weight % and paraffins 10-50 weight %.

In an embodiment in the present diesel fuel composition the hydrotreated renewable fuel component comprises or consists of hydrotreated vegetable oil, hydrotreated animal fat, hydrotreated fish fat, hydrotreated fish oil, hydrotreated algae oil, hydrotreated microbial oil, hydrotreated wood and/or other plant based oil, hydrotreated recyclable waste and/or residue or a combination thereof. An advantage of the embodiment is that when said materials are used in hydrotreating, a renewable fuel component is obtained which together with a cetane number improver is able to synergistically increase cetane number of fuel compositions comprising fossil fuel component. Additionally carbon residue increase can be minimized.

In an embodiment the present cetane number improver comprises or consists of 2-EHN. 2-EHN is particularly useful to increase cetane number of a blend comprising a hydrotreated renewable fuel component, such as HVO, and a fossil fuel component.

In an embodiment in the present hydrotreated renewable fuel component the amount of the paraffinic components in a range of carbon number $C_{15}$-$C_{18}$ is at least 70 wt-%, more preferably more than 80 wt-%, most preferably more than 90 wt-%. When a hydrotreated renewable fuel component having said paraffinic component profile is used to together with 2-EHN, the cetane number of the fuel composition increases.

In an embodiment in the present hydrotreated renewable fuel component the amount of the paraffinic components in the range of carbon number $C_3$-$C_{14}$ is less than 25 wt-%, such as less than 20 wt-%, less than 10% wt-%, or less than 7 wt-%. Optionally in the hydrotreated renewable fuel component the amount of the paraffinic components in the range of carbon number $C_{19}$-$C_{24}$ is less than 25 wt-%, such as less than 20 wt-%, less than 10 wt-%, or less than 5 wt-%.

In an embodiment the present hydrotreated renewable component has a cetane number of at least 70, preferably at least 80. By using a hydrotreated renewable component having high cetane number, a smaller addition of hydrotreated renewable component and a cetane number improver provides a desired increase in a blend comprising a fossil fuel component.

In an embodiment the present hydrotreated renewable fuel component comprises hydrotreated vegetable oil, hydrotreated wood and/or other plant based oil, hydrotreated animal fat, hydrotreated fish fat and oil, hydrotreated algae oil, hydrotreated microbial oil, hydrotreated recyclable waste, hydrotreated recyclable residue, or a combination thereof.

In an embodiment the content of the hydrotreated renewable fuel component in the present diesel fuel composition is in the range of 5-90 vol-%, more preferably in the range of 20-80 vol-%. In an embodiment the content of the hydrotreated renewable fuel component in the diesel fuel composition is 20, 25, 30, 35, 40, 45, 50, 55, 60, 65, 70, 75 or 80 vol-%.

In an embodiment the present diesel fuel composition is a fuel composition obtainable by blending the diesel fuel component with fossil diesel fuel.

In an embodiment the present diesel fuel component does not contain fatty acid methyl esters. The final diesel fuel composition may contain further refinery and performance components such as lubricity, cold flow, antistatic and detergent components.

EXAMPLES

The following examples are provided to illustrate various aspects of the present invention. They are not intended to limit the invention, which is defined by the accompanying claims.

Example 1: Carbon Number Profile of a Renewable Fuel and GTL

Carbon number profiles of HVO as a renewable fuel and GTL were analysed by gas chromatography (GC). The results are shown in FIG. 1 and FIG. 5.

Example 2: Analysis of a Renewable Fuel and GTL

Physical properties of HVO as a renewable fuel and GTL samples were analysed. The results are shown in table 1. The analysis reveals marked differences in important parameters of these fuels.

TABLE 1

Analysis of HVO and GTL components. Starting point of distillation (Initial boiling point), end point of distillation (95 vol-% recovered at).

|  |  |  | GTL3 | RN2 |
|---|---|---|---|---|
| ENISO12185:1996 | Density | kg/m3 | 764.9 | 781.1 |
| ASTMD7689: 2012 | Cloud point | ° C. | −16.3 | −16.1 |
| EN15195: 2014 | Cetane Number |  | 77.8 | 85.1 |
| ENISO3405: 2012 | Initial boiling point | ° C. | 162.8 | 227.6 |
| ENISO3405: 2012 | 95 vol-% recovered at | ° C. | 320 | 298.7 |

Example 3

Two diesel blends were prepared with base cetane level of about 42. One contained renewable paraffinic diesel and the second one not. Three 2-EHN levels were tested on these blends. Cetane numbers are presented in table 2. Corresponding fuels with base cetane level of about 48 were prepared and cetane responses of 2-EHN measured accordingly (Results in table 3)

Figure 2:
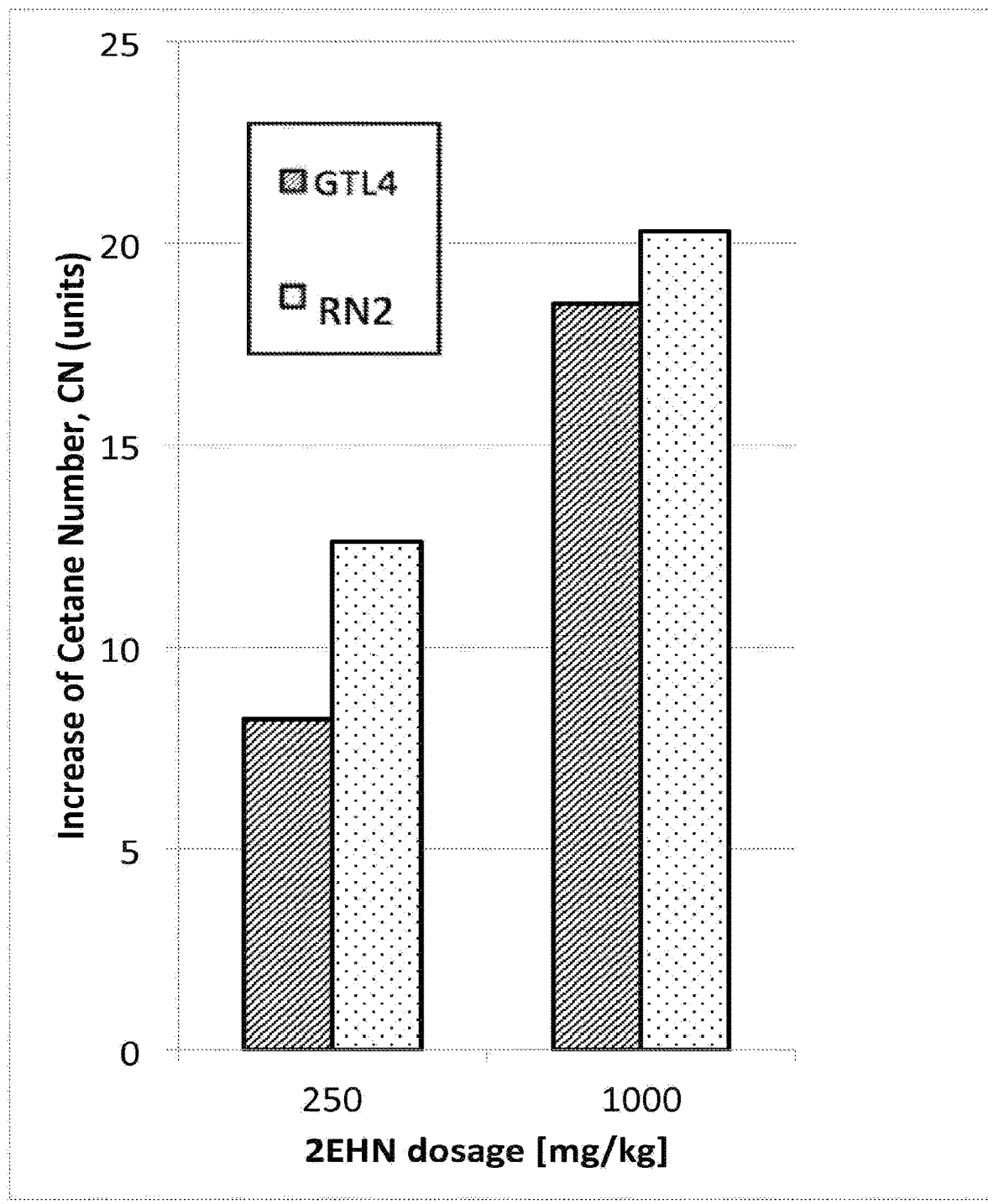
FIG. 2 shows the effect of different amounts of 2-EHN addition in GTL and renewable fuel (RN2) fuel blends.

Increase of cetane number of a composition comprising GTL or renewable fuel, and 2-EHN was analysed using two 2-EHN dosages. The results are illustrated in FIG. 2 showing greater increase of the cetane number in blends comprising renewable fuel compared to blends comprising GTL. 2-EHN is also shown to increase cetane number at different 2-EHN levels.

TABLE 2

Cetane responses with various 2-EHN dosing rates, base diesel cetane number ~42.

| 2-EHN dosage, [mg/kg] | Fossil fuel component 70% + RN 30%, Cetane Number | Cetane Number improvement | Fossil diesel 1, Cetane Number | Cetane Number improvement |
|---|---|---|---|---|
| 0 | 42.9 | — | 42.2 | — |
| 200 | 45.9 | 3 | 44.2 | 2 |

TABLE 2-continued

Cetane responses with various 2-EHN dosing rates, base diesel cetane number ~42.

| 2-EHN dosage, [mg/kg] | Fossil fuel component 70% + RN 30%, Cetane Number | Cetane Number improvement | Fossil diesel 1, Cetane Number | Cetane Number improvement |
|---|---|---|---|---|
| 500 | 47.6 | 4.7 | 46.1 | 3.9 |
| 1000 | 49.1 | 6.2 | 47.8 | 5.6 |

TABLE 3

Cetane responses with various 2-EHN dosing rates, base diesel cetane number ~48

| 2-EHN dosage, [mg/kg] | Fossil fuel component 60% + RN 40% | Cetane Number improvement | Fossil diesel 2, Cetane Number | Cetane Number improvement |
|---|---|---|---|---|
| 0 | 48.1 | — | 48.6 | — |
| 200 | 50.6 | 2.5 | 50.5 | 1.9 |
| 500 | 52.3 | 4.2 | 51.8 | 3.2 |
| 1000 | 53.6 | 5.5 | 53.2 | 4.6 |

Figure 3:
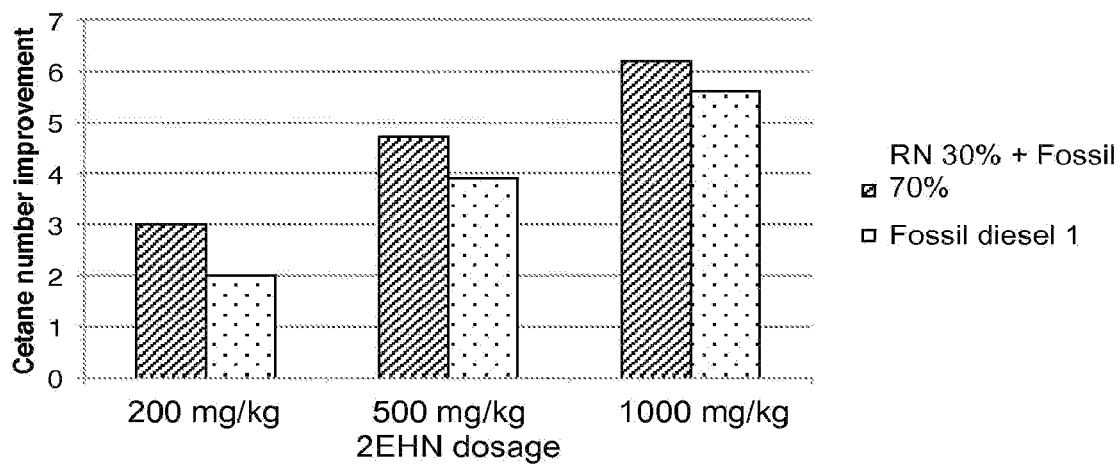
FIG. 3 shows graphically the cetane number improvement in a renewable fuel (RN) and fossil fuel blend compared to a fossil diesel fuel.
Figure 4:
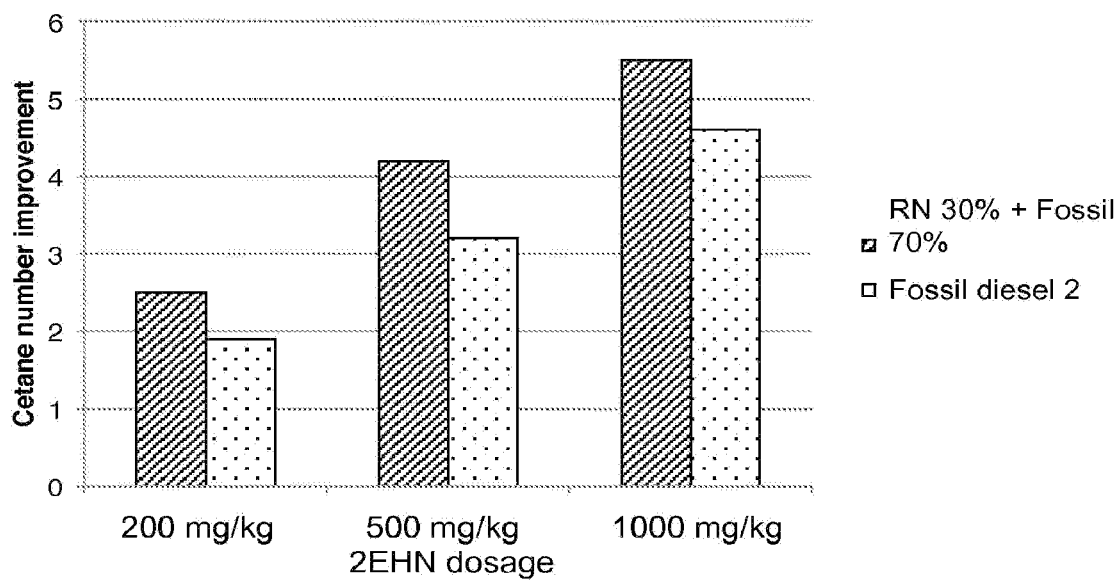
FIG. 4 shows graphically the cetane number improvement in a renewable fuel (RN) and fossil fuel blend compared to a fossil diesel fuel.

In all cases, the fuels containing renewable paraffinic diesel showed greater cetane response of 2-EHN. Results are depicted in FIGS. 3 and 4.

As a conclusion lower dosing of cetane number improver is required in fuels containing renewable paraffinic diesel in order to meet cetane number target. In addition to meeting cetane number requirements in EN590:2013 (5.5.2) and ASTM D975 2017, it is beneficial in producing premium diesel grades with higher cetane number.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A diesel fuel composition comprising:
a hydrotreated renewable fuel component, a fossil fuel component and a cetane number improver, wherein the hydrotreated renewable fuel component contains at least 80 wt-% of $C_{15}$-$C_{18}$ paraffins and has an i-paraffin/n-paraffin ratio of at least 2.2 w/w;
wherein the hydrotreated renewable fuel component constitutes 5-90 vol-% of the diesel fuel composition;
the cetane number improver is 2-ethylhexyl nitrate (2-EHN), and
the amount of 2-EHN is in a range of 100-1000 mg/kg in the diesel fuel composition.

2. The diesel fuel composition of claim 1, wherein the content of the hydrotreated renewable fuel component in the diesel fuel composition is in the range of 20-80 vol-%.

3. The diesel fuel composition of claim 1, wherein the content of the hydrotreated renewable fuel component in the diesel fuel composition is in the range of 20-80 vol-%, and the content of the fossil fuel component in the diesel fuel composition is 80-20 vol-%.

4. The diesel fuel composition of claim 1, wherein the hydrotreated renewable fuel component has a cloud point of at least −10° C.

5. The diesel fuel composition of claim 1, wherein the diesel fuel composition does not contain Fischer-Tropsch derived GTL fuel.

6. The diesel fuel composition of claim 1, wherein the hydrotreated renewable fuel component contains hydrotreated vegetable oil (HVO), hydrotreated animal fat, hydrotreated fish fat, hydrotreated fish oil, hydrotreated algae oil, hydrotreated microbial oil, hydrotreated wood and/or other plant based oil, hydrotreated recyclable waste and/or residue, or a combination thereof.

7. The diesel fuel composition of claim 1, wherein the hydrotreated renewable fuel component contains at least 90 wt-% of $C_{15}$-$C_{18}$ paraffins.

8. The diesel fuel composition of claim 1, wherein the i-paraffin/n-paraffin ratio of the hydrotreated renewable fuel component is at least 3 w/w.

9. The diesel fuel composition of claim 1, wherein the amount of 2-EHN is in a range 100-450 mg/kg.

10. A method for producing a diesel fuel composition comprising: mixing a hydrotreated renewable fuel component, a cetane number improver, and a fossil fuel component, wherein:
the hydrotreated renewable fuel component contains at least 80 wt-% of $C_{15}$-$C_{18}$ paraffins and has an i-paraffin/n-paraffin ratio of at least 2.2 w/w;
the hydrotreated renewable fuel component constitutes 5-90 vol-% of the diesel fuel composition;
the cetane number improver is 2-ethylhexyl nitrate (2-EHN); and
the amount of 2-EHN is in the range of 100-1000 mg/kg in the diesel fuel composition.

11. The method of claim 10, wherein the content of the hydrotreated renewable fuel component in the diesel fuel composition is in the range of 20-80 vol-%.

12. The method of claim 10, wherein the content of the hydrotreated renewable fuel component in the diesel fuel composition is in the range of 20-80 vol-%, and the content of the fossil fuel component in the diesel fuel composition is 80-20 vol-%.

13. The method of claim 10, wherein the diesel fuel composition does not contain Fischer-Tropsch derived GTL fuel.

14. The method of claim 10, wherein the hydrotreated renewable fuel component is prepared from a renewable raw material feed having less than 10 w-ppm alkaline metals and alkaline earth metals calculated as elemental alkaline metals and elemental alkaline earth metals, less than 10 w-ppm other metals calculated as elemental metals, and less than 30 w-ppm phosphorus calculated as phosphorus.

15. A method for improving cetane number in a diesel fuel composition, comprising:
mixing a hydrotreated renewable fuel component, a cetane number improver, and a fossil fuel component, wherein:

the hydrotreated renewable fuel component contains at least 80 wt-% of $C_{15}$-$C_{18}$ paraffins and has an i-paraffin/n-paraffin ratio of at least 2.2 w/w;

the hydrotreated renewable fuel component constitutes 5-90 vol-% of the diesel fuel composition;

the cetane number improver is 2-ethylhexyl nitrate (2-EHN); and the amount of 2-EHN is in the range of 100-1000 mg/kg in the diesel fuel composition.

16. The method of claim 15, wherein there is a synergistic cetane number increase with the hydrotreated renewable fuel component and the 2-ethylhexyl nitrate (2-EHN).

* * * * *